United States Patent
Itoh et al.

(10) Patent No.: US 10,942,647 B2
(45) Date of Patent: Mar. 9, 2021

(54) KEYBOARD INPUT MODE SWITCHING APPARATUS, SYSTEMS, AND METHODS

(71) Applicant: LENOVO (Singapore) PTE. LTD., New Tech Park (SG)

(72) Inventors: Hiroshi Itoh, Yokohama (JP); Garner Jervis Kong Tan, Yokohama (JP); ZhePeng Wang, Beijing (CN)

(73) Assignee: Lenovo (Singapore) PTE. LTD., New Tech Park (SG)

( * ) Notice: Subject to any disclaimer, the term of this patent is extended or adjusted under 35 U.S.C. 154(b) by 195 days.

(21) Appl. No.: 15/662,804

(22) Filed: Jul. 28, 2017

(65) Prior Publication Data
US 2018/0032247 A1 Feb. 1, 2018

(30) Foreign Application Priority Data
Jul. 28, 2016 (JP) .............................. JP2016-148413

(51) Int. Cl.
G06F 3/0488 (2013.01)
G06F 3/023 (2006.01)
G06F 3/0482 (2013.01)
G06F 3/0489 (2013.01)

(52) U.S. Cl.
CPC ........ *G06F 3/04886* (2013.01); *G06F 3/0233* (2013.01); *G06F 3/0238* (2013.01); *G06F 3/0482* (2013.01); *G06F 3/0488* (2013.01); *G06F 3/04897* (2013.01)

(58) Field of Classification Search
CPC .................................................. G06F 3/04886
See application file for complete search history.

(56) References Cited

U.S. PATENT DOCUMENTS

| | | | | |
|---|---|---|---|---|
| 5,675,361 A * | 10/1997 | Santilli | ................. | G06F 3/0213 345/156 |
| 6,597,345 B2 * | 7/2003 | Hirshberg | ............. | G06F 3/0234 341/22 |
| 7,091,954 B2 * | 8/2006 | Iesaka | .................. | G06F 1/1616 345/156 |
| 8,933,888 B2 * | 1/2015 | Laubach | ............. | G06F 3/04812 345/168 |
| 9,041,652 B2 * | 5/2015 | Elias | ....................... | G06F 3/044 341/22 |
| 9,195,321 B2 * | 11/2015 | Laubach | ............. | G06F 3/04845 |

(Continued)

FOREIGN PATENT DOCUMENTS

| | | |
|---|---|---|
| JP | 11305896 A | 11/1999 |
| JP | 2012-108963 A | 7/2012 |
| JP | 2016-105297 A | 9/2016 |

OTHER PUBLICATIONS

Oikawa, Hayato & Takahashi, Masanobu. (2008). Pointing system using fingers on keyboard. 10.1109/SICE.2008.4655142. (Year: 2008).*

*Primary Examiner* — William L Bashore
*Assistant Examiner* — Nathan K Shrewsbury
(74) *Attorney, Agent, or Firm* — Kunzler Bean & Adamson

(57) ABSTRACT

A keyboard input mode switching apparatus includes a processor for an information handling device and a memory that stores code executable by the processor. The code is executable by the processor to determine an operational state of a keyboard and, in response to detecting a particular operational state, switch an input mode of a portion of the keyboard.

20 Claims, 9 Drawing Sheets

(56) References Cited

U.S. PATENT DOCUMENTS

| | | | | |
|---|---|---|---|---|
| 9,454,239 B2* | 9/2016 | Elias | | G06F 3/0213 |
| 9,965,136 B1* | 5/2018 | Brichter | | G06F 3/0481 |
| 10,001,844 B2* | 6/2018 | Namba | | G06F 3/017 |
| 10,048,862 B2* | 8/2018 | Stewart | | G06F 3/04886 |
| 2002/0171564 A1* | 11/2002 | Jam | | G06F 3/0219 |
| | | | | 341/23 |
| 2003/0201982 A1* | 10/2003 | Iesaka | | G06F 1/1616 |
| | | | | 345/168 |
| 2005/0235210 A1* | 10/2005 | Peskin | | G06F 3/04897 |
| | | | | 715/716 |
| 2006/0034043 A1* | 2/2006 | Hisano | | G06F 1/1616 |
| | | | | 361/679.04 |
| 2010/0066695 A1* | 3/2010 | Miyazaki | | G06F 3/04886 |
| | | | | 345/173 |
| 2010/0194690 A1* | 8/2010 | Wilairat | | G06F 3/0237 |
| | | | | 345/168 |
| 2011/0074830 A1* | 3/2011 | Rapp | | G06F 3/04883 |
| | | | | 345/677 |
| 2011/0167366 A1* | 7/2011 | Wagner | | G06F 3/0483 |
| | | | | 715/765 |
| 2011/0239153 A1* | 9/2011 | Carter | | G06F 3/04812 |
| | | | | 715/784 |
| 2011/0285631 A1* | 11/2011 | Imamura | | G06F 1/1616 |
| | | | | 345/168 |
| 2011/0285652 A1* | 11/2011 | Imamura | | G06F 1/1616 |
| | | | | 345/173 |
| 2011/0291979 A1* | 12/2011 | Sahashi | | G06F 3/04886 |
| | | | | 345/173 |
| 2011/0302519 A1* | 12/2011 | Fleizach | | G06F 3/03547 |
| | | | | 715/773 |
| 2012/0078614 A1* | 3/2012 | Galor | | G06F 3/011 |
| | | | | 704/9 |
| 2012/0113007 A1* | 5/2012 | Koch | | G06F 3/0488 |
| | | | | 345/168 |
| 2012/0113023 A1* | 5/2012 | Koch | | G06F 3/04886 |
| | | | | 345/173 |
| 2012/0287050 A1* | 11/2012 | Wu | | G06F 1/1673 |
| | | | | 345/168 |
| 2013/0194230 A1* | 8/2013 | Kawaguchi | | G06F 3/0416 |
| | | | | 345/174 |
| 2013/0241837 A1* | 9/2013 | Oga | | G06F 3/04886 |
| | | | | 345/168 |
| 2013/0305178 A1* | 11/2013 | Matsuzawa | | G06F 3/0237 |
| | | | | 715/773 |
| 2013/0307784 A1* | 11/2013 | Matsuzawa | | G06F 3/0237 |
| | | | | 345/169 |
| 2013/0339895 A1* | 12/2013 | Hirshberg | | G06F 3/04886 |
| | | | | 715/773 |
| 2014/0078063 A1* | 3/2014 | Bathiche | | G06F 3/0234 |
| | | | | 345/168 |
| 2014/0145945 A1* | 5/2014 | Shin | | G06F 3/017 |
| | | | | 345/157 |
| 2014/0176435 A1* | 6/2014 | Jiang | | G06F 3/0213 |
| | | | | 345/158 |
| 2014/0204042 A1* | 7/2014 | Lin | | G06F 1/1692 |
| | | | | 345/173 |
| 2014/0218298 A1* | 8/2014 | Law | | G06F 3/0216 |
| | | | | 345/168 |
| 2014/0306897 A1* | 10/2014 | Cueto | | G06F 3/04883 |
| | | | | 345/173 |
| 2014/0306898 A1* | 10/2014 | Cueto | | G06F 3/04883 |
| | | | | 345/173 |
| 2015/0077342 A1* | 3/2015 | Liu | | G06F 1/1662 |
| | | | | 345/168 |
| 2015/0091804 A1* | 4/2015 | Ito | | G06F 3/04883 |
| | | | | 345/168 |
| 2015/0253870 A1* | 9/2015 | Ikeda | | G06F 3/04886 |
| | | | | 345/158 |
| 2015/0268734 A1* | 9/2015 | Liu | | G06F 3/0304 |
| | | | | 345/156 |
| 2015/0277598 A1* | 10/2015 | Aurongzeb | | G06F 3/041 |
| | | | | 345/157 |
| 2015/0293644 A1* | 10/2015 | Watanabe | | G06F 3/0426 |
| | | | | 345/168 |
| 2016/0004329 A1* | 1/2016 | Myers | | G06F 3/016 |
| | | | | 463/37 |
| 2016/0041678 A1* | 2/2016 | Wu | | G06F 3/0416 |
| | | | | 345/173 |
| 2016/0103610 A1* | 4/2016 | Huh | | G06F 3/14 |
| | | | | 345/168 |
| 2016/0328147 A1* | 11/2016 | Zhang | | G06F 3/0237 |
| 2018/0018060 A1* | 1/2018 | Luo | | G06F 3/03547 |
| 2018/0032247 A1* | 2/2018 | Itoh | | G06F 3/0238 |
| 2018/0300056 A1* | 10/2018 | Buxton | | G06F 3/0236 |

* cited by examiner

KEYBOARD INPUT MODE SWITCHING APPARATUS, SYSTEMS, AND METHODS

CROSS-REFERENCE TO RELATED APPLICATIONS

This application claims priority to Japan Patent Application No. 2016-148413 filed on Jul. 28, 2016 for Itoh et al., the entire contents of which are incorporated herein by reference for all purposes.

FIELD

The various embodiments relate to keyboard input mode switching apparatus, systems, and methods, and particularly, for an on screen keyboard.

BACKGROUND

With the recent widespread adoption of information processing apparatus including a touch panel display for displaying images, computing apparatus using a software keyboard (e.g., an On Screen Keyboard ("OSK"), which can also be referred to as a screen keyboard) to enable key input has been developed. For example, one computing apparatus includes a mode-switching button to enable the software keyboard to also be used as a touch pad. However, when a user operates the mode-switching button, the user is required to turn his or her eyes away from the display to check the position of the mode-switching button on the software keyboard. Therefore, the user may not be able to perform continuous key input operations when switching to a touch pad operation, and hence cannot perform smooth (e.g., seamless) switching operations.

Japanese Patent Application No. 2016-52864 discloses a device for switching between modes without using the mode-switching button. Specifically, Japanese Patent Application No. 2016-52864 discloses an input device that switches between a key input mode that allows input from a software keyboard and a pointing device mode that allows input as a pointing device according to the detection result of a palm on a touch panel. However, the input device disclosed in Japanese Patent Application No. 2016-52864 is required to provide a palm rest area on the touch panel to detect the palm, and this can put restrictions on the configuration of the software keyboard. Further, a user may be required to keep his or her palm in the palm rest area during key input, which can affect operability because the user may be forced to maintain a specific posture and/or position for his or her palm.

BRIEF SUMMARY

Various embodiments provide keyboard input mode switching apparatus, systems, and methods. Further embodiments provide methods and computer program products related to such keyboard input mode switching apparatus, systems, and methods.

In one embodiment, a keyboard input mode switching apparatus includes a processor for an information handling device and a memory that stores code executable by the processor. The code is executable by the processor to determine an operational state of a keyboard and, in response to detecting a particular operational state, switch an input mode of a portion of the keyboard.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
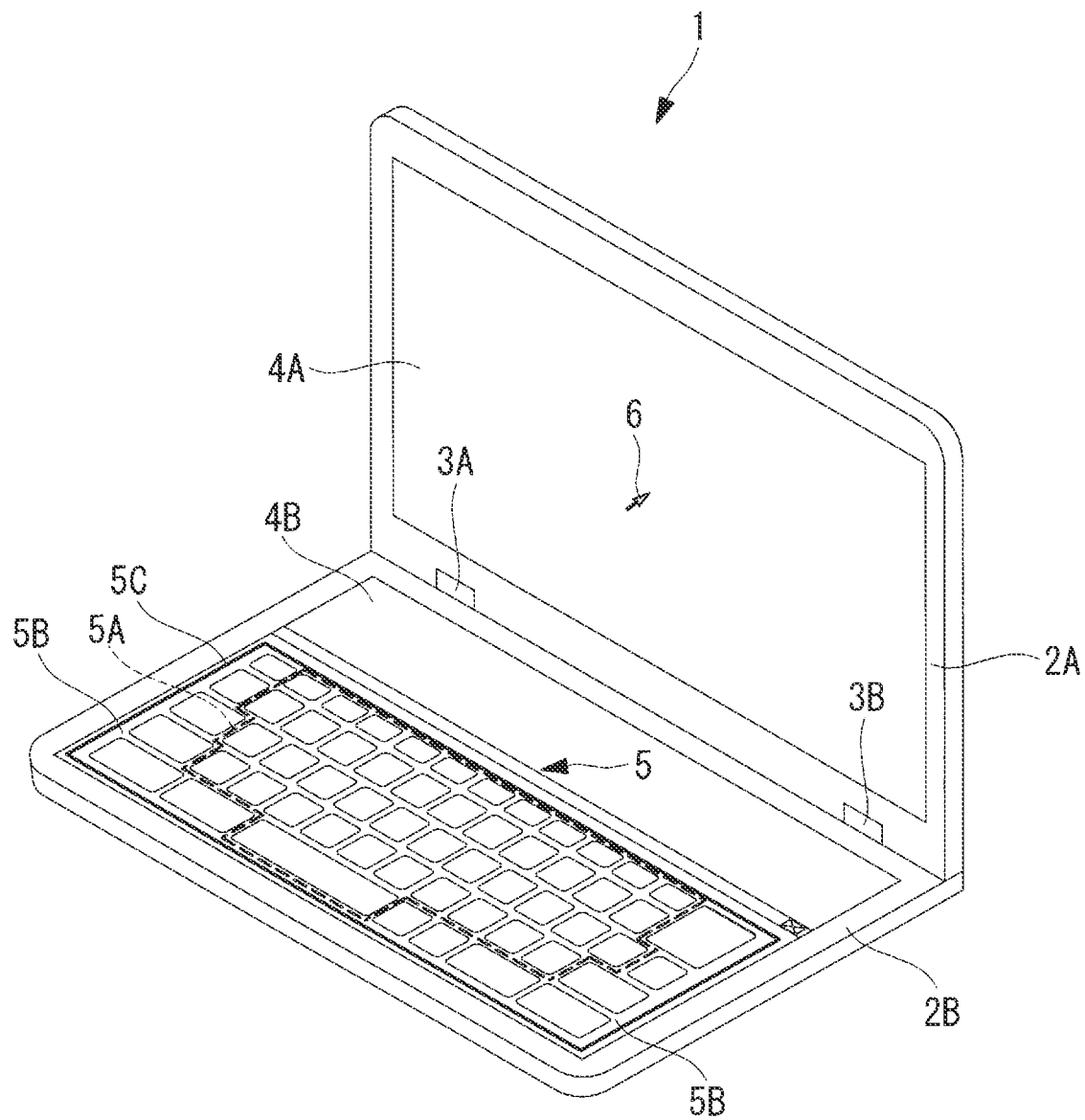
FIG. 1 is a schematic external view of one embodiment of a laptop personal computer (PC)

Various embodiments provide apparatus, systems, input switching methods, and computer program products that are capable of switching input modes to a software keyboard. The input modes can allow a keyboard to accept one or more inputs that are different than character inputs.

An information processing device or apparatus according to one embodiment includes an information processing device that can accept a character input operation. The information processing device further includes a display control unit that displays a software keyboard including a character key area to accept character input, an operational state determining unit that determines the state of an operation for a pointing body to an area where the software keyboard is displayed is an operation to an area including at least the character key area and that the operational state is a predetermined state other than the character input operation, and an input mode switching unit which, in response to the operational state being determined to be the predetermined state by the operational state determining unit, switches a mode of one or more areas including at least part of the character key area in a display area of the software keyboard from a first mode to accept the character input to a second mode to accept input different from the character input.

In another embodiment, an information processing device includes an apparatus that can accept a character input operation including, for example, a display control unit that displays a software keyboard including a character key area to accept character input and an operational state determining unit that determines that the state of an operation with a pointing body to an area in which the software keyboard is displayed is an operation to an area including at least the character key area and that the operational state is a predetermined state other than the character input operation. Here, in response to the operational state being determined to be the predetermined state by the operational state determining unit, the display control unit switches a display state of one or more areas including at least part of the character key area in a display area of the software keyboard.

An input switching method for an information processing apparatus that accepts a character input operation includes displaying a software keyboard including a character key area to accept character input, determining that the state of an operation with a pointing body to an area in which the software keyboard is displayed is an operation to an area including at least the character key area and that the operational state is a predetermined state other than the character input operation, and in response to the operational state being determined to be the predetermined state, switching a mode of one or more areas including at least part of the character key area in a display area of the software keyboard from a first mode that accepts character inputs to a second mode that accepts inputs that are different from the character input.

An input switching method according to another embodiment includes displaying a software keyboard including a character key area to accept character inputs, determining that the state of an operation of a pointing body to an area in which the software keyboard is displayed is an operation to an area including a character key area, and determining that the operational state is a predetermined state other than the character input operation. Here, in response to the operational state being determined to be the predetermined state, a display state of one or more areas including at least part of the character key area in a display area of the software keyboard is switched in the determination(s).

A computer program product according to various embodiments includes a display control unit that displays a software keyboard including a character key area to accept character inputs, an operational state determining unit that determines that the state of an operation of a pointing body to an area in which the software keyboard is displayed is an operation to an area including a character key area and that the operational state is a predetermined state other than the character input operation, and an input mode switching unit that, in response to the operational state being determined to be the predetermined state by the operational state determining unit, switches a mode of one or more areas including at least part of the character key area in a display area of the software keyboard from a first mode that accepts character inputs to a second mode that accepts inputs that are different from the character inputs.

A computer program product according to some embodiments includes a display control unit that displays a software keyboard having a character key area to accept character input and an operational state determining unit that determines that the state of an operation of a pointing body to an area in which the software keyboard is displayed is an operation to an area including at least the character key area and that the operational state is a predetermined state other than the character input operation. Here, in response to the operational state being determined to be the predetermined state by the operational state determining unit, the display control unit switches a display state of one or more areas including at least part of the character key area in a display area of the software keyboard.

According to the various embodiments discussed above, a software keyboard can be switched to include inputs other than character inputs. That is, the various embodiments can allow a keyboard to accept character inputs and non-character inputs.

With reference to the drawings, FIG. 1 is a diagram illustrating a schematic external view of one embodiment of a laptop personal computer (PC) 1. At least in the embodiment illustrated in FIG. 1, a laptop PC 1 includes, among other components, a first chassis 2A and a second chassis 2B, both of which include substantially rectangular shapes.

The first chassis 2A and the second chassis 2B may be coupled to each other by a pair of right and left coupling parts 3A, 3B in respective end portions. The coupling parts 3A, 3B may be hinges that can allow the first chassis 2A and the second chassis 2B to open and close.

In various embodiments, the first chassis 2A includes a touch panel display 4A and the second chassis 2B includes a touch panel display 4B. In the following description, to distinguish the touch panel displays 4A and 4B from each other an A or B is suffixed to the reference numeral 4, while when the touch panel displays 4A and 4B do not need to be distinguished from each other, the A and B are omitted and just the reference numeral 4 is cited.

A touch panel display 4 can convert display data to a video signal to display, on a display screen, a variety of information/data corresponding to the converted display data. A touch panel display 4 can also accept inputs via touching of a pointing body such as a user's finger, stylus, or pen to detect various operations with the pointing body. Further, a laptop PC 1 can be configured to be able to display a software keyboard (hereinafter referred to as "OSK") 5 on the touch panel display 4 as a user interface to allow a user to perform an input operation.

An OSK 5 includes a character key area 5A for accepting character inputs and function key areas 5B for accepting function inputs other than the character input. The character key area 5A includes multiple character keys and the function key areas 5B include multiple function keys. In the embodiment shown in FIG. 1, an area within the broken-line boundary in the OSK 5 include the character key area 5A and areas outside of the broken line boundary include the function key areas 5B. An area including the character key area 5A (e.g., an area of the character key area 5A) and the function key areas 5B are collectively called a key area 5C in the embodiment.

The character key area 5A and the function key areas 5B include both images indicative of respective keys and the boundary sections between adjacent keys and peripheral sections of respective keys. There are various known keys as the function keys including keys that may not be illustrated in the accompanying drawings of the embodiment and keys that are adopted or not adopted depending on the kind of laptop PC 1 or the kind of application software running on the laptop PC 1 (e.g., shift key "Shift," function key "Fn," control key "Ctrl," alternate key "Alt," delete key "Delete," backspace key "Backspace," enter key "Enter," key "&123" or key "Symbol" to switch among input character types, and key to switch between uppercase input and lowercase input). Further, in the embodiment shown in FIG. 1, a space key may be considered one of the character keys. Moreover, the key area 5C may include the character key area 5A without including the function key areas 5B.

In the example of FIG. 1, the touch panel display 4B can serve as a secondary monitor to display the OSK 5. On the other hand, the touch panel display 4A can serve as a primary monitor to display various applications, windows, a pointer 6 (also called a mouse cursor), and the like operated through the OSK 5.

Figure 2:
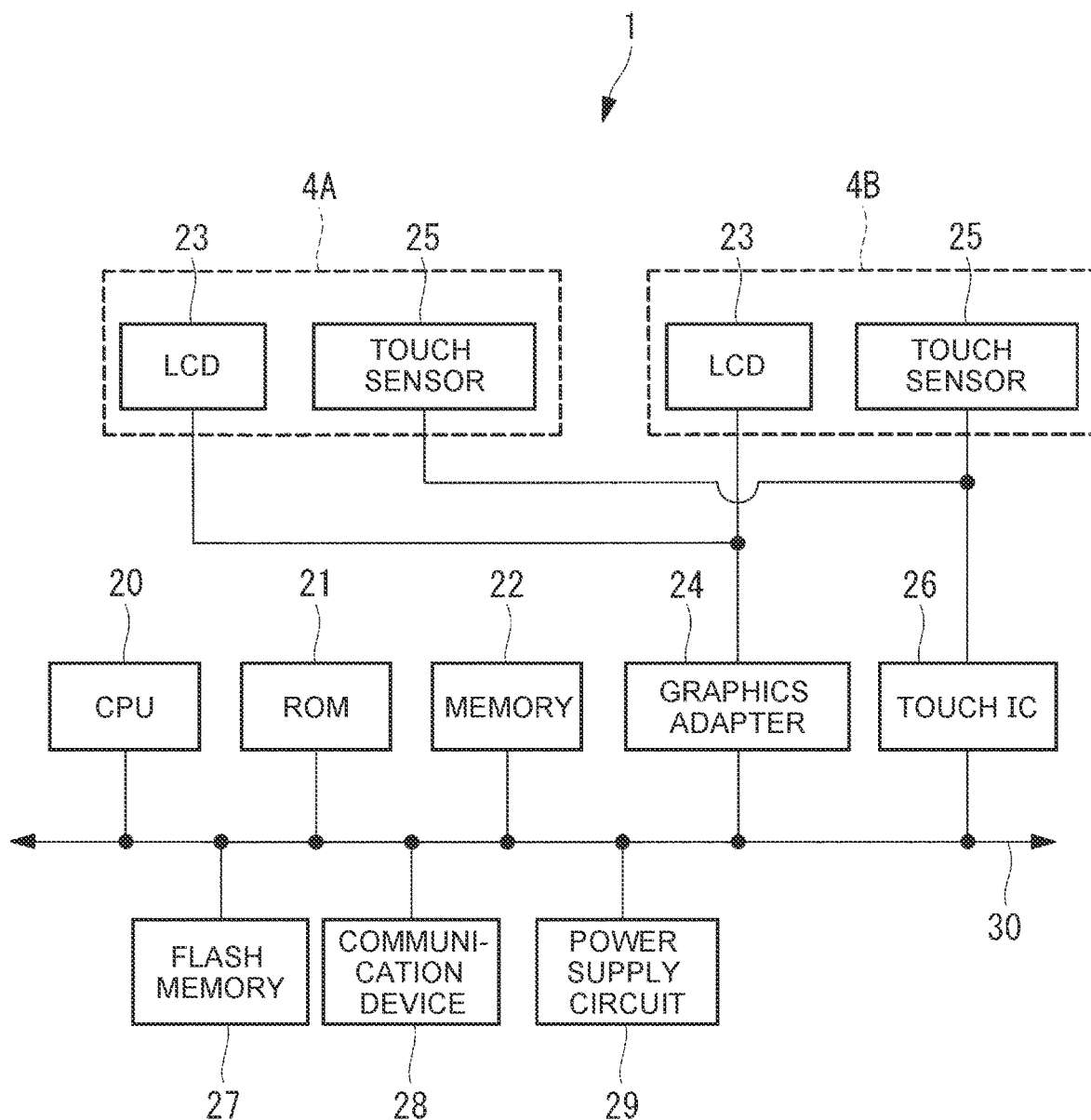
FIG. 2 is a block diagram illustrating an embodiment of an electrical configuration of the laptop PC of FIG. 1.

FIG. 2 is a schematic diagram illustrating one embodiment of a hardware configuration of the laptop PC 1. The laptop PC 1 includes, among other components, a Central Processing Unit (CPU) 20, a Read Only Memory (ROM) 21, a memory 22, a Liquid Crystal Display (LCD) 23, a graphics adapter 24, a touch sensor 25, a touch IC 26, a flash memory 27, a communication device 28, and a power supply circuit 29, which are connected directly or indirectly to one another via a bus 30. Each of the touch panel displays 4A and 4B may be configured to include the LCD 23 and the touch sensor 25, respectively.

The CPU 20 includes functionality to control the entire laptop PC 1 via an Operating System (OS) stored in, for example, the flash memory 27 and the functionality of performing processing according to user operations through the touch panel display 4 or the like based on various programs, code, and/or instructions stored in the flash memory 27.

The ROM 21 can store a Basic Input/Output System (BIOS), various data, and/or the like. The memory 22 may include a cache memory and a Random Access Memory (RAM), which includes a writable memory that can be used as a working area to read a program and/or code executed by the CPU 20 and write data processed by the executed program and/or code.

The LCD 23 displays, as an image, a video signal from the graphics adapter 24, which is controlled by the CPU 20. The graphics adapter 24 converts display information and/or data to a video signal controlled by the CPU 20 and outputs the converted display data to the LCD 23.

The touch sensor 25 can detect a touch position of a user's finger, a touch pen, stylus, and/or the like on the LCD 23, and outputs the touch position to the touch IC 26 in response thereto. In response to detecting the finger, a touch pen, and/or stylus, etc., the touch sensor 25 selects a screen object from among various menus, icons, buttons, and a keyboard displayed on the screen of the LCD 23 to perform an input operation or to perform a text input operation or a screen operation (e.g., a scroll or swipe with a user's finger, stylus, or touch pen).

The touch Integrated Circuit (IC) 26 controls the operation of the touch sensor 25 via a processor executing a program and/or code stored in the ROM 21 and/or the like memory to perform various processing operations. The flash memory 27 includes functionality to store the OS for controlling the entire laptop PC 1, various hardware drivers for operating peripheral devices, applications for use in specific business, various data and files, and/or the like components. The laptop PC 1 may include any other storage unit such as an HDD (Hard Disk Drive) as a storage unit alternative to the flash memory 27, among other storage devices that are possible and contemplated herein.

The communication device 28 can communicate with other devices and/or systems. The power supply circuit 29 includes, among other components, an AC adapter, a battery, a charger for charging the battery, a DC/DC converter, and/or the like components to supply power to each device controlled by the CPU 20.

Figure 3:
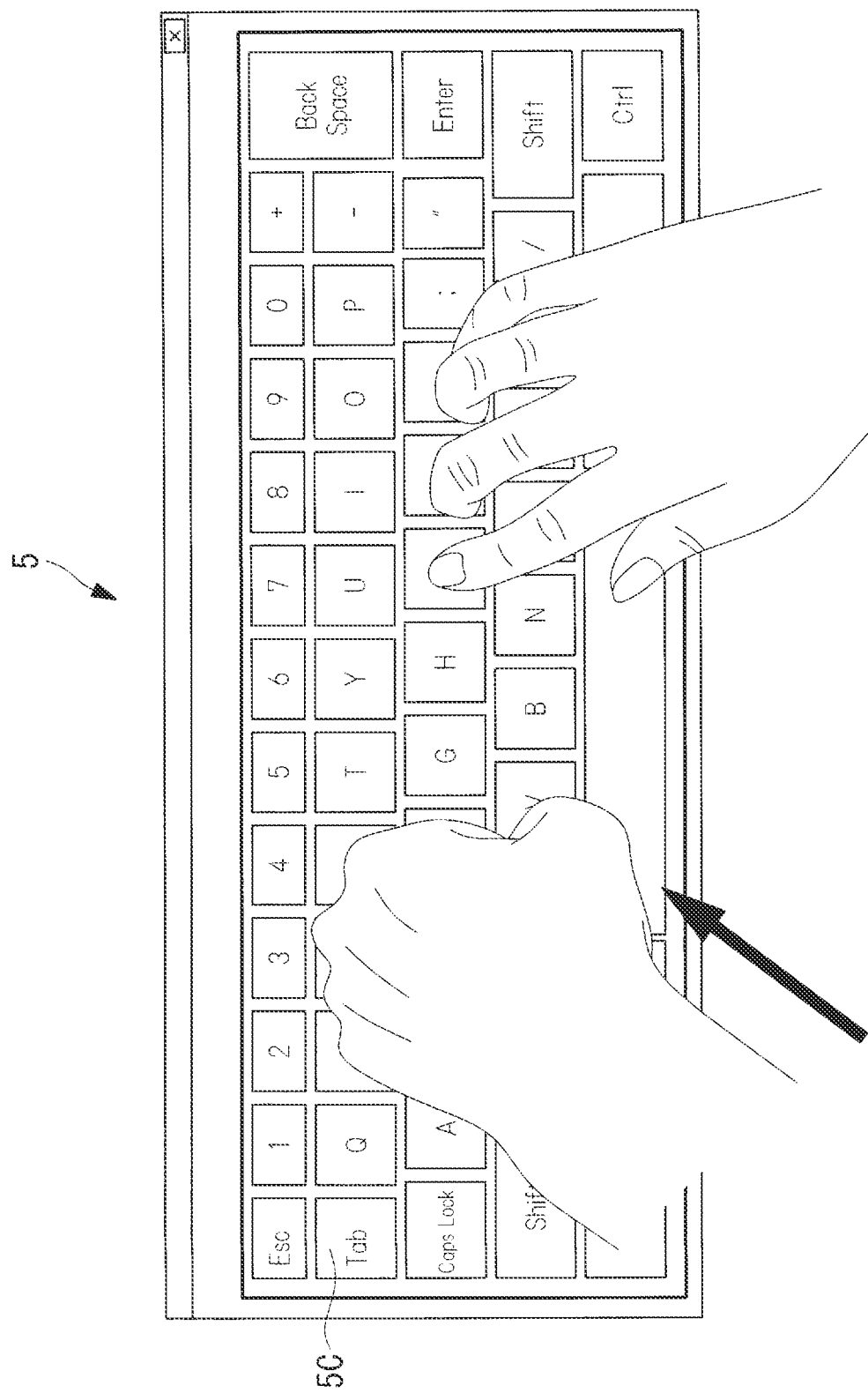
FIG. 3 is a schematic view of one embodiment of an OSK in a keyboard mode.

With reference to FIG. 3, FIG. 3 is a schematic view of one embodiment of an OSK 5. As discussed elsewhere herein, the OSK 5 can include a key area 5C, which includes a character key area 5A and/or function key area(s) 5B composed of various keys, each of which can accept character inputs, commands, and/or the like inputs. The following embodiments provide a mode of accepting character inputs or the like via one or more keys, which may be referred to as a keyboard mode.

An OSK 5, in accordance with one embodiment, can operate in a pointing device mode that can accept various inputs that are different than character inputs. For example, a pointing device mode can include a mode to accept at least a pointing operation that allows a pointing operation to move the pointer 6 displayed on the touch panel display 4A (e.g., a primary monitor) via a user moving a pointing body (e.g., a user's finger, stylus, or a pen) on the OSK 5, a tap operation, a flick operation, a pinch-in operation, a pinch-out operation, a drag operation, a scroll operation, and/or the like onto a target icon and/or other item on the touch panel display 4A. A touch pad is an example of a pointing device, among other types of input devices that are possible and contemplated herein.

A laptop PC 1 according to one embodiment includes an OSK mode switching function that can switch between a keyboard mode and a pointing device mode in response to an operational state (e.g., the operation(s)) of a pointing body of the key area 5C on the OSK 5 displayed on the touch panel display 4B. For instance, in response to the state of the operation to the key area 5C being a predetermined state (e.g., a predetermine operational state or condition) other than that of a character input operation, state or condition, a keyboard mode may be switched to the pointing device mode.

In the following description, human fingers and/or hands are described as examples of pointing bodies used to operate the OSK 5. However, various embodiments contemplate that other human body part may be utilized as pointing bodies.

Operational states of an OSK 5 may include a first operational state (e.g., typing) to perform character input to the OSK 5 and a second operational state as a state other than that of the character input operation (e.g., a finger rest) in which contact and/or the proximity of one or more fingers can be used as an input.

As an example, a first state (e.g., typing) can be determined and/or initiated in response to a predetermined quantity of fingers being in contact with the key area 5C, the contact area, and/or for a preset contact time. On the other hand, a quantity of fingers in contact with the key area 5C, the contact area, and/or being in contact for a preset contact time can generate values defining a finger rest and, in response thereto, the second operational state can be determined and/or initiated.

In some embodiments, a state in which the mode is switched to the pointing device mode can be the second state. In additional or alternative embodiments, switching to the pointing device mode may further include a different or sub-state (hereinafter called a "third state") of the second state. In the following description, the mode is switched to the pointing device mode in response to the operational state being determined to be the third state. For example, a third state may be a state of simultaneous contact and/or proximity of fingers in multiple portions of the key area 5C of the OSK 5 and/or a state in which the area of contact and/or proximity of fingers or a hand with the key area 5C is greater than a predetermined area and/or amount.

Specifically, in response to the contact or proximity portions being equal to a preset quantity or number (hereinafter called the "set number") on either the left or the right of the key area 5C, the operational state is determined to be the third state. This set number, in some embodiments, can be a value larger than the number of fingers in contact with or proximity to the key area 5C during typing. In additional or alternative embodiments, in response to the contact or proximity area becoming greater than the set area on either the left or the right of the key area 5C, the operational state can be determined to be the third state.

A set area can be, for example, an area in which a palm or a first is placed on the key area 5C. In the example of FIG. 3, since the left first is placed on the key area 5C, this state can be considered the third state.

Figure 4:
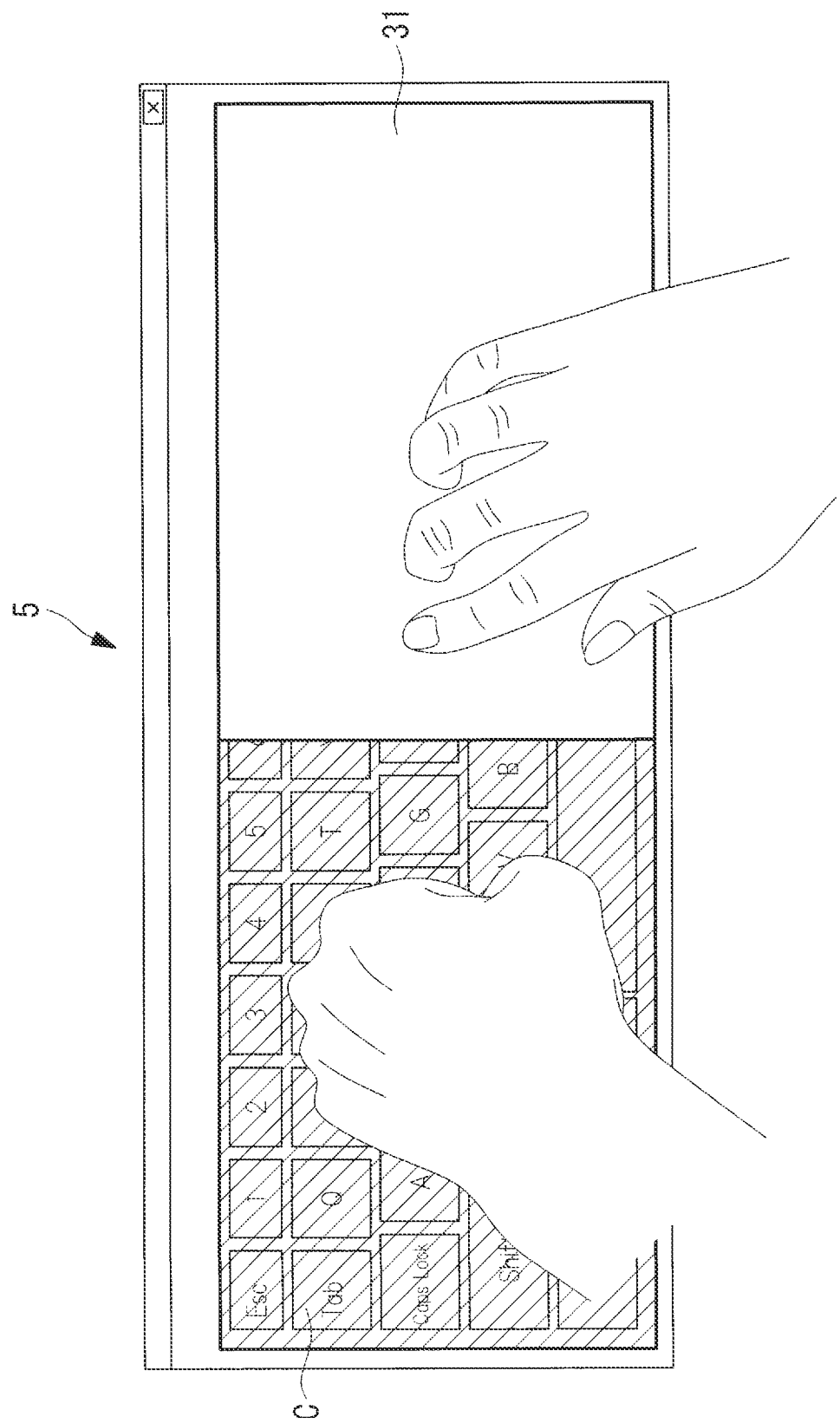
FIG. 4 is a schematic view of one embodiment of the OSK of FIG. 3 in a pointing device mode.

FIG. 4 is a schematic view of the OSK 5 illustrating one embodiment of an operational state being determined to be the third state and the keyboard mode is switched to the pointing device mode. In the example of FIG. 4, the left hand is clenched into a first and placed on the OSK 5 to switch the right of the OSK 5 to the pointing device mode. In other words, the laptop PC 1 according to this embodiment switches the mode to the pointing device mode in an area different from the contact area in the third state within the display area of the OSK 5.

For example, when the display area of the OSK 5 is virtually divided into two areas (e.g., left and right areas) and the left area is determined to be the third state, the right area of the OSK 5 becomes a touch pad 31. On the other hand, when the right area is determined to be the third state, the left area of the OSK 5 becomes the touch pad 31. The display area of the OSK 5 determined to be the third state has no function as the keyboard mode, and only the operational state is determined.

In a further example, when the display area of the OSK 5 is virtually divided into upper and lower areas and the upper area is determined to be the third state, the lower area of the OSK 5 may become the touch pad 31. Further, when the lower area is determined to be the third state, the upper area of the OSK 5 may become the touch pad 31.

In some embodiments, the display area of the OSK 5 switching to the pointing device mode switches a keyboard image to an image indicative of the touch pad 31.

Figure 5:
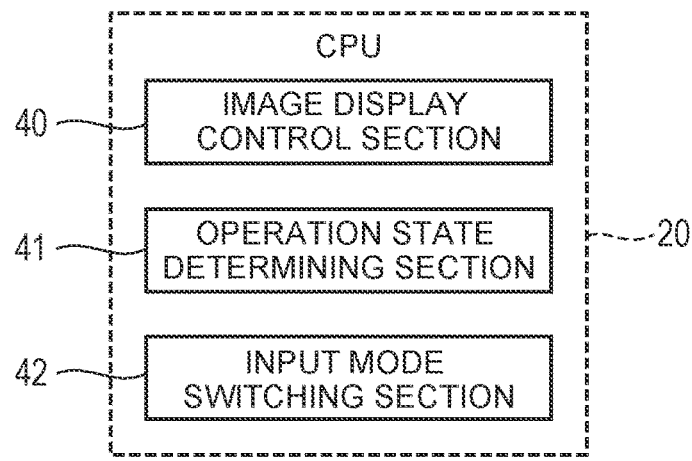
FIG. 5 is a functional block diagram illustrating an embodiment of an OSK mode-switching function.

FIG. 5 is a functional block diagram illustrating an embodiment of an OSK mode-switching function. The CPU 20 includes, among other sections, an image display control section 40, an operational state determining section 41, and an input mode-switching section 42. Each of the functions provided by the CPU 20 may be implemented via a program, instructions, and/or computer code.

The image display control section 40 displays various images on the touch panel display 4. In response to the state of an operation to the OSK 5 being determined to be the third state by the operational state determining section 41, the image display control section 40 according to one embodiment switches the display state of one or more areas including at least part of the character key area 5A in the display area of the OSK 5.

For instance, the image display control section 40 can change the display image and/or brightness of the area of the OSK 5 where the function of the pointing device mode is executed. In the example of FIG. 4, in response to the OSK 5 being switched to the pointing device mode, displaying a white rectangular image, for example, can be an image indicative of the touch pad 31, among other images that are possible and contemplated herein. Any other suitable color image other than and/or in addition to white may be displayed and/or the backlight of the touch panel display 4B may be turned OFF in response to the OSK 5 being switched to the pointing device mode provided that the mode switching is in a display state recognizable by the user.

The operational state determining section 41 determines that the operation of user's fingers or a hand proximate to the OSK 5 is an operation to an area including at least a portion of the character key area 5A (e.g., the key area 5C) to determine the operational state to be the third state. The operational state can be determined based on the degree of dispersion from a contact point obtained from the detection results of the touch sensor 25, a pressure value, an area of pressure, and/or the like. Further, the operational state determining section 41 can determine whether the operational state is the first state, the second state, and/or the third state. In addition, in response to determining the third state, the operational state determining section 41 can detect continuing contact and/or proximity of one or more pointing bodies with the area where the OSK 5 is displayed.

In response to the operational state determining section 41 determining that the operational state is the third state, the input mode switching section 42 switches the mode of one or more areas including at least a portion of the character key area 5A in the display area of the OSK 5 from the keyboard mode to the pointing device mode.

The input mode switching section 42 according to one embodiment switches the mode to the pointing device mode in such a state that continuing contact or continuing proximity of fingers or a hand is detected. Further, in response to no longer detecting continuing contact and/or continuing proximity of fingers or a hand, the input mode switching section 42 switches the mode from the pointing device mode to the keyboard mode. In other words, in addition to the state in which contact or proximity is determined to be the third state is continued, even when the operational state becomes a different contact or proximity state after that, the pointing device mode is continued while contact or proximity is continued. Note that the different contact or proximity state is, for example, a state in which the number of fingers in contact with the key area 5C is reduced or increased from the state determined to be the third state, or a state in which the contact area of a palm or a first in contact with the key area 5C is reduced or increased.

Figure 6:
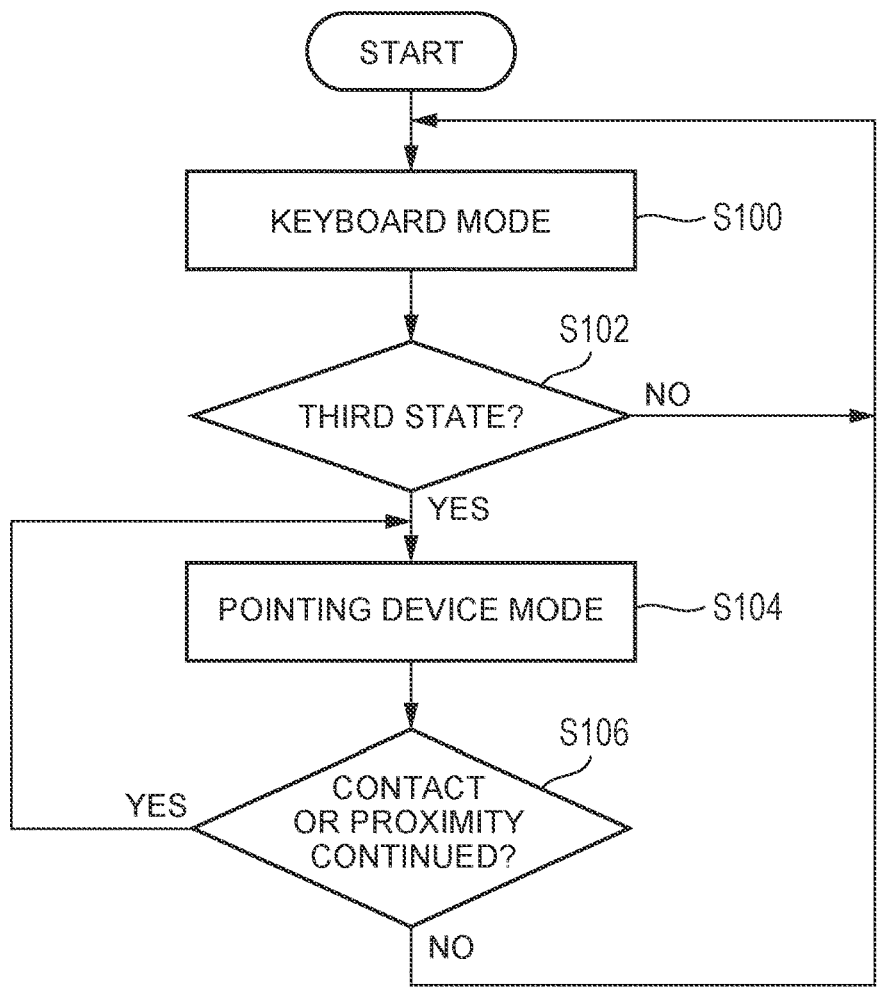
FIG. 6 is a flow diagram illustrating one embodiment of an OSK mode-switching method.

FIG. 6 is a flow diagram illustrating an embodiment of an OSK mode switching function. In some embodiments, processing is started in response to starting the OSK 5 and ends in response to closing the OSK 5.

Initially, the OSK 5 is set in the keyboard mode (block S100). In block S102, it is determined whether the state of an operation to the key area 5C is the third state. In response to determining the third state (e.g., a YES in block S102), the function proceeds to block S104. In response to determining another state (e.g., a NO in block S102), the function returns to block S100 to maintain the keyboard mode.

In block S104, the keyboard mode is switched to the pointing device mode using, as a trigger, the fact that the operational state is the third state. In block S106, it is determined whether contact or proximity with or to the key area 5C is continued. In response to continued contact/ proximity (e.g., a YES in block S106), the function returns to block S104 to maintain the pointing device mode. On the other hand, in response to no longer detecting contact/ proximity (e.g., a NO in block S106), the function returns to block S100 to switch the pointing device mode to the keyboard mode.

Accordingly, the laptop PC 1 according to various embodiments sets the pointing device mode while contact or proximity of fingers or a hand with or to the key area 5C is continue, and switches the pointing device mode to the keyboard mode in response to contact and/or proximity ending.

Figure 7:
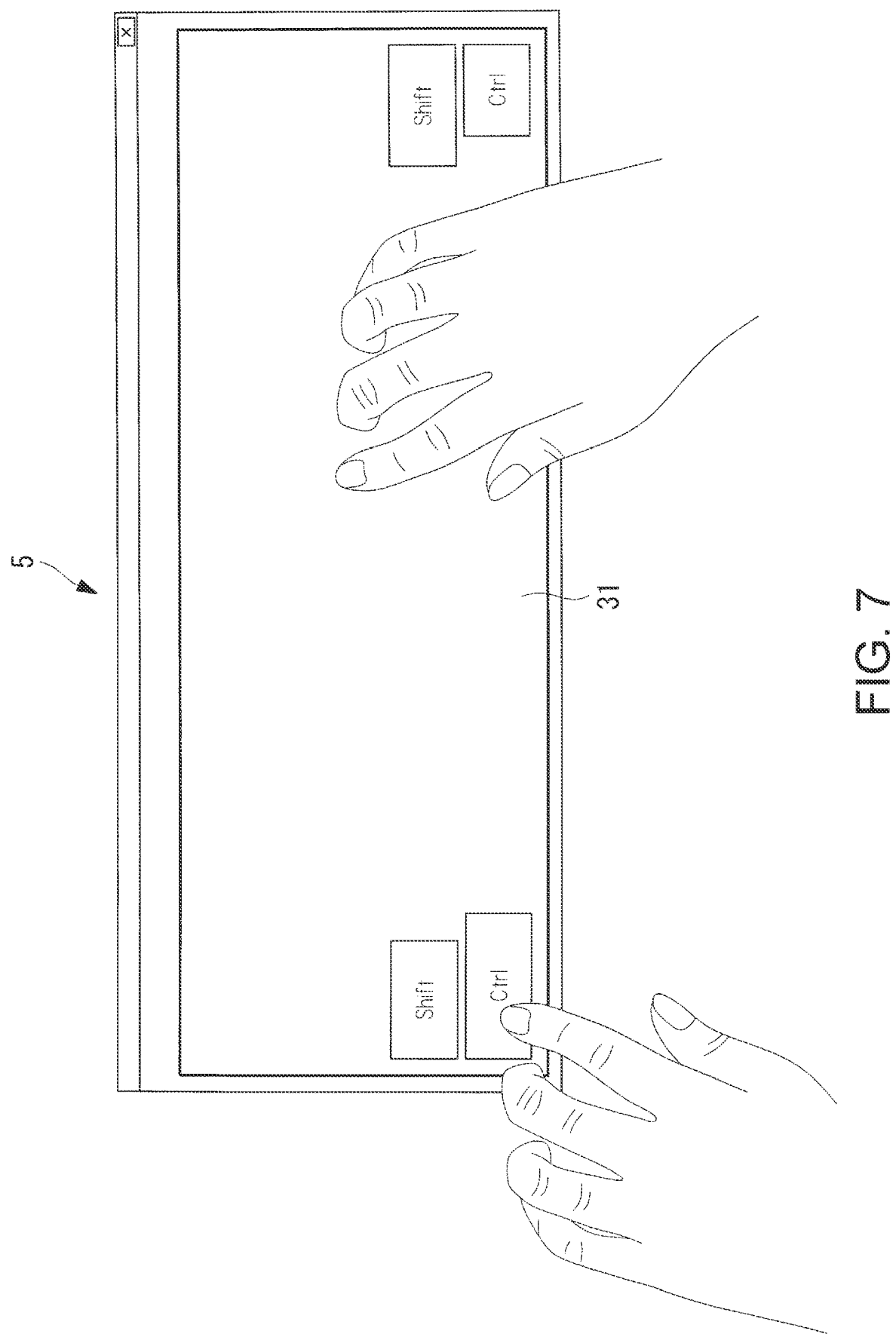
FIG. 7 is a schematic view of the OSK of FIG. 3 operating in another pointing device mode.

As illustrated in FIG. 7, the entire display area of the OSK 5 may also be set as the touch pad 31. Further, when the mode is switched to the pointing device mode, the image display control section 40 may display some function keys (e.g., a Shift key and/or Ctrl key) operated in combination with the touch pad 31. In some embodiments, for example, the user can perform a pointing operation with the right hand and a key input operation with the left hand operating in the pointing device mode.

Figure 8:
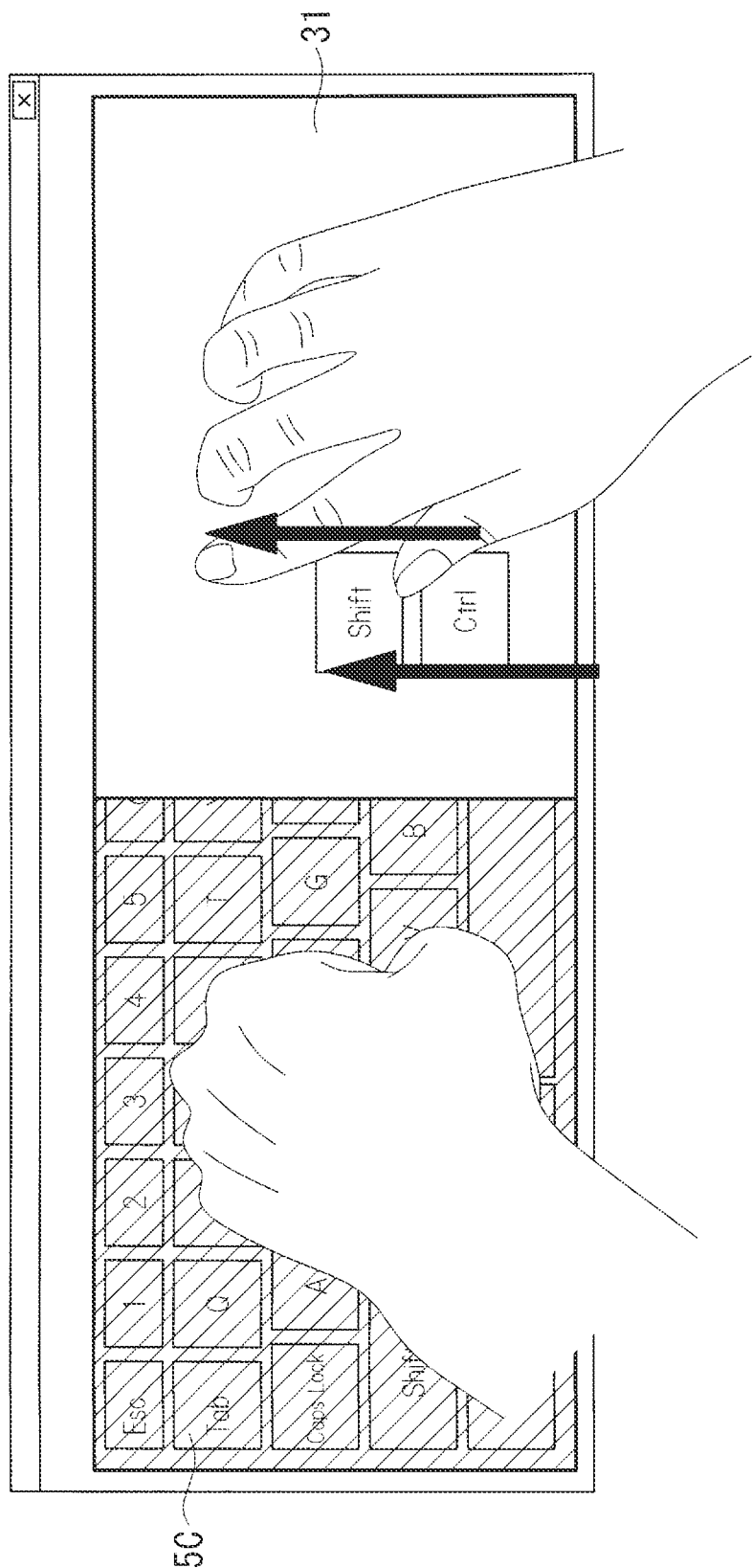
FIG. 8 is a schematic view of the OSK of FIG. 3 operating in yet another pointing device mode.

Further, as illustrated in FIG. 8, when part of the OSK 5 is set as the touch pad 31, the function keys may move together with a finger moving in the key area 5C. For example, when a pointing operation is performed with the index finger, the function keys can change positions to allow the user to press the function keys with, for example, a thumb, among other pointing bodies that are possible and contemplated herein.

As discussed elsewhere herein, the laptop PC 1 according to some embodiments can determine an operational state with fingers or a hand to the touch panel display 4B in which the OSK 5 is displayed, and switches the display area of the OSK 5 from the keyboard mode to accept character input to the pointing device mode to accept input different from the character input when the operational state is determined to the third state.

Accordingly, the user can switch the OSK 5 from the keyboard mode to the pointing device mode with good operability by switching the state of the operation to the key area 5C to the third state. This can allow the user to make a transition to a pointing operation smoothly (e.g., seamlessly) even during key input and to return to the key input.

In a further embodiment, the laptop PC 1 according to some embodiments allows the user to release the contact or proximity state determined to be the third state after the mode is switched to the pointing device mode (e.g., the pointing device mode is kept even when the hand or fingers get away from the key area 5C). Since the configuration of the laptop PC 1 according to the embodiment is the same as that of the laptop PC 1 (see e.g., FIG. 1), the description thereof is omitted.

The operational state determining section 41 according to an embodiment determines a toggle operation (hereinafter called a "release operation") to release the pointing device mode after the third state is determined. The release operation is, for example, the same operation as a predetermined operation determined to be the third state. The release operation may be a predefined operation in any other state, such as a swipe from an area in which the touch pad 31 is not displayed (e.g., the hatched area in FIG. 4) toward a direction in which the touch pad 31 is displayed, a double tap in the area in which the touch pad 31 is not displayed, or the like.

In response to determining the release operation, the operational state determining section 41 outputs a command to release the pointing device mode (hereinafter called the "release command") to the input mode switching section 42. Further, in addition to the release operation, when there is contact or proximity with or to any area of the touch panel display 4 other than the display area of the OSK 5, the operational state determining section 41 may output the release command to the input mode switching section 42 such as when there is no operation input during a predetermined time period or more, upon switching between applications, or when there is an operation to implement any other event.

The input mode switching section 42 according to one embodiment keeps the pointing device mode until the release command is accepted even after the operational state of one or more pointing bodies (e.g., finger(s) and/or a hand) becomes a state different from the third state. Further, when accepting the release command, the input mode switching section 42 switches form the pointing device mode to the keyboard mode (e.g., a toggle mode).

Figure 9:
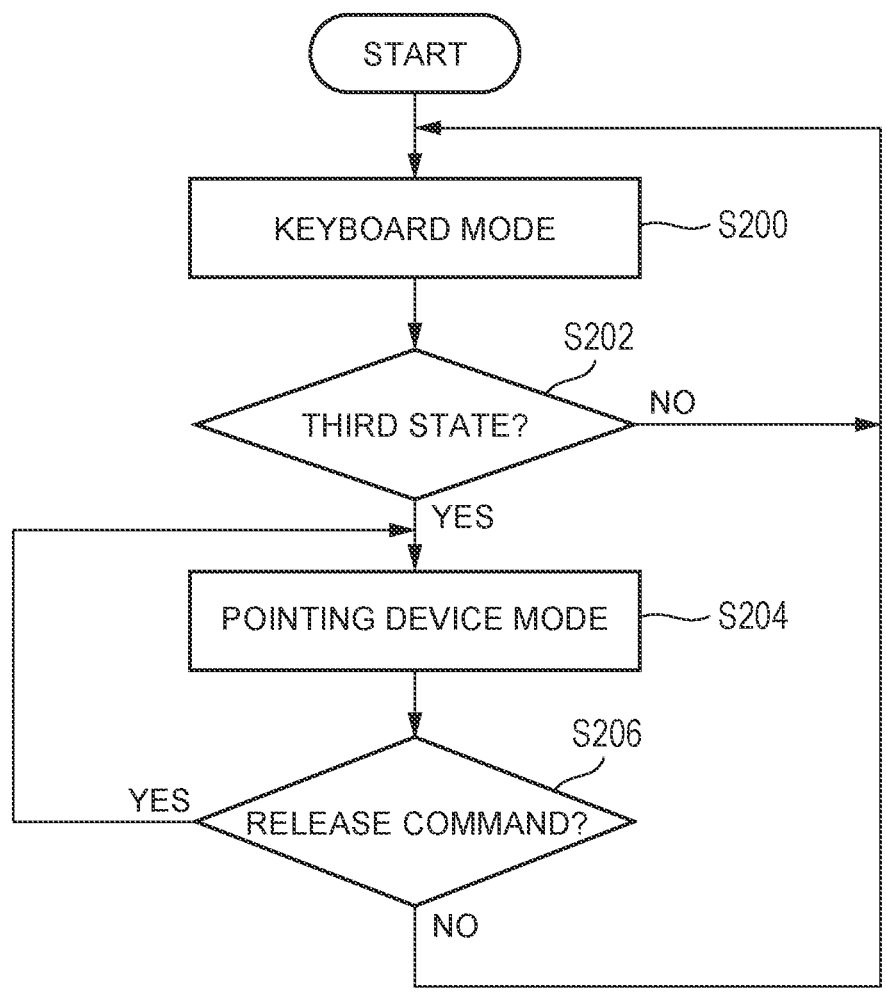
FIG. 9 is a flow diagram illustrating another embodiment of an OSK mode-switching method.

FIG. 9 is a flow diagram illustrating processing of the OSK mode switching function according to one embodiment. Processing may be started in response to the OSK 5 starting up and ends in response to the OSK 5 being closed.

In block S200, the OSK 5 set in the keyboard mode. In block S202, it is determined whether the state of an operation to the key area 5C is the third state.

In response to being in the third state (e.g., a YES in block S202), the function proceeds to block S204. In response to being in another state (e.g., a NO in block S202), the function returns to block S200 to maintain the keyboard mode.

In block S204, the keyboard mode is switched to the pointing device mode using, as a trigger, the fact that the operational state is the third state. Then, in the laptop PC 1 according to the embodiment, the pointing device mode is kept even when the user moves his or her hand or fingers completely away from the key area 5C.

In block S206, the input mode switching section 42 determines whether the release command is accepted. In response to accepting the command (e.g., a YES in block S206), the function returns to block S204 to maintain the pointing device mode. On the other hand, in response to the command not being accepted (e.g., a NO in block S206), the function returns to block S200 to switch the pointing device mode to the keyboard mode.

The technical scope of the various embodiments disclosed and discussed herein are not limited to those described in the aforementioned embodiments. Various changes and/or improvements can be added to the aforementioned embodiments without departing from the spirit of the technology, and forms to which the change or improvements are added shall also be included in the technical scope of the technology. Further, the aforementioned embodiments may also be combined appropriately.

Figure 10:
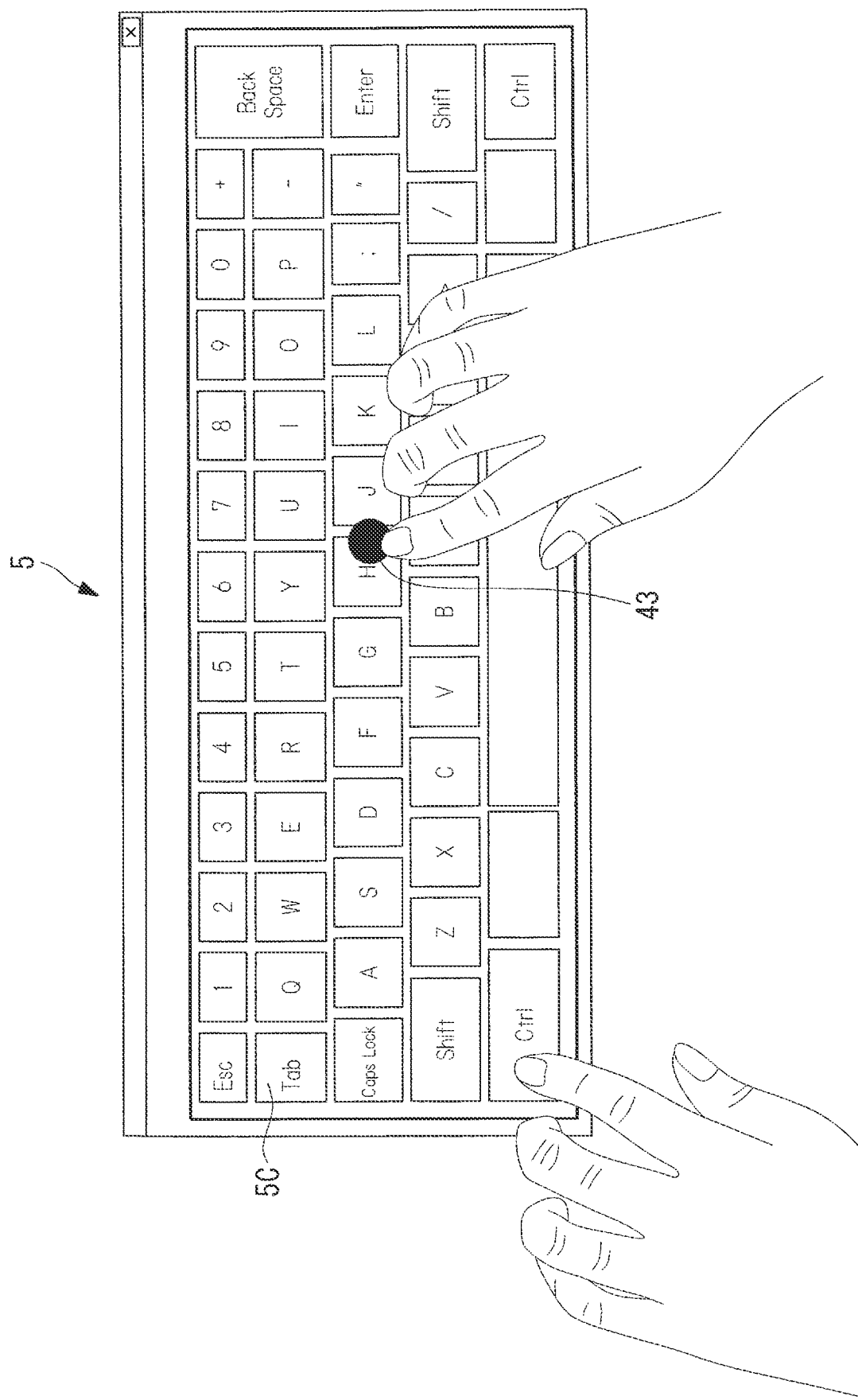
FIG. 10 is a schematic view of an OSK in a pointing device mode in accordance with various embodiments.

For example, the form of using the OSK 5 as the touch pad 31 in the pointing device mode is described in the aforementioned embodiments, but the scope is not limited to this form. That is, the pointing device mode may be a mode of accepting at least a pointing operation. For example, as illustrated in FIG. 10, the form may be to display a software button 43 (also called a pointing stick) to perform a pointing operation to the OSK 5 as the pointing device mode.

As an example, the software button 43 may be displayed near the center of the OSK 5. In response to an upper portion of the software button 43 being pressed by the user, the pointer 6 may be moved in the up direction. Similarly, in response to a lower portion being pressed by the user, the pointer 6 may be moved in the down direction. Further, in response to a right portion being pressed by the user, the pointer 6 may be moved in the right direction and in response to a left portion being pressed by the user, the pointer 6 may be moved in the left direction. Note that input of all keys is enabled in the pointing device mode in which the software button 43 is displayed.

Further, in the various embodiments, the form of using part or whole of the display area of the OSK 5 as the touch pad 31 in the pointing device mode is described, but the various embodiments are not limited thereto. For example, the form may use, as the touch pad 31, not only the display area of the OSK 5, but also the whole display area of the touch panel display 4B.

Further, the various embodiments are described in the form of displaying the OSK 5 on the touch panel display 4 serving as a display device of the laptop PC 1, but the scope is not limited thereto. For example, the form may be such that the OSK 5 is displayed on a keyboard device separate from that of the laptop PC 1 including the touch panel display. Further, the OSK 5 may be a keyboard projected on any object, such as a desk, a paper medium, or a human body, or projected in the air. In such a form, the operational state to the character key area 5A on the projected keyboard can be determined from an image or the like acquired with a camera or the like.

Further, the OSK 5 according to some embodiments does not have a permanent touch pad, but the various embodiments are not limited thereto. That is, the various embodiments may also be applied to the OSK 5 including a permanent touch pad. In such a form, a user who desires to perform a pointing operation with better operability can switch the OSK 5 from the keyboard mode to the pointing device mode.

In addition, the flow of processing of the OSK mode switching function described in each of the aforementioned embodiments is just an example, and it is possible to delete an unnecessary operation, add a new operation, or replace the processing order without departing from the scope of the various embodiments.

The foregoing description has been directed to the embodiment(s) illustrated in the drawings. The present technology, however, is not limited to the illustrated embodiment(s), and may, of course, employ any known configuration as long as advantages of the embodiment(s) can be obtained.

What is claimed is:

1. An apparatus, comprising:
a processor of an information handling device; and
a memory that stores code executable by the processor to:
determine a particular operational state of a software keyboard based on a user providing a user input at a second portion of the software keyboard,
in response to determining the particular operational state:
switch an input mode of operation for a first portion of the software keyboard from a first mode of operation to a second mode of operation, and
switch the second portion of the software keyboard from the input mode of operation to a third mode of operation including:
a non-functional portion, and
operations for determining a different mode of operation for the second portion of the software keyboard, and
in response to the user continuously providing the user input at the second portion of the software keyboard:
operating the first portion of the software keyboard in the second mode of operation, and
operating the second portion of the software keyboard in the third mode of operation.

2. The apparatus of claim 1, wherein the particular operational state comprises a non-key operational state for the software keyboard.

3. The apparatus of claim 2, wherein the non-key operational state comprises one of contact and proximity of a pointing body to an area of the second portion of the software keyboard.

4. The apparatus of claim 2, wherein the non-key operational state comprises one of contact and proximity of a pointing body to a plurality of areas of the second portion of the software keyboard.

5. The apparatus of claim 2, wherein the non-key operational state comprises simultaneous contact and proximity of a pointing body to an area of the second portion of the software keyboard.

6. The apparatus of claim 2, wherein the non-key operational state comprises simultaneous contact and proximity of a pointing body to a plurality of areas of the second portion of the software keyboard.

7. The apparatus of claim 1, wherein:
the first mode of operation comprises a character input mode; and
the second mode of operation comprises a directional input mode.

8. The apparatus of claim 7, wherein:
the software keyboard comprises an on screen keyboard;
in response to switching from the first mode of operation to the second mode of operation, the first portion of the software keyboard comprises a touch pad; and
the directional input mode comprises touch inputs.

9. The apparatus of claim 1, wherein the code is further executable by the processor to:
monitor the operational state of the software keyboard; and
in response to detecting a change in the operational state:
switch the input mode of the first portion of the software keyboard from the second mode of operation to the first mode of operation, and
switch the third mode of the second portion of the software keyboard to the input mode of operation.

10. The apparatus of claim 9, wherein:
the particular operational state comprises a non-key operational state for the software keyboard;
the non-key operational state comprises one of contact and proximity of a pointing body to an area of the second portion of the software keyboard; and
the code is further executable by the processor to detect the change in the operational state by determining that the pointing body is no longer the one of the contact and the proximity of the pointing body to the area of the portion of the software keyboard.

11. A method, comprising:
determining, by a processing device, a particular operational state of an on screen keyboard (OSK) based on a user providing a user input at a second portion of the OSK;
in response to determining a particular operational state:
switching an input mode of operation for a first portion of the OSK from a first mode of operation to a second mode of operation, and
switching the second portion of the OSK from the input mode of operation to a third mode of operation including:
a non-functional portion, and
operations for determining a different mode of operation for the second portion of the OSK; and
in response to the user continuously providing the user input at the second portion of the OSK:
operating the first portion of the OSK in the second mode of operation, and
operating the second portion of the OSK in the third mode of operation.

12. The method of claim 11, wherein:
detecting the particular operational state comprises detecting a non-key operational state for the OSK; and
the non-key operation state comprises one of:
one of contact and proximity of a pointing body to an area of the second portion of the OSK,
one of contact and proximity of the pointing body to a plurality of areas of the second portion of the OSK,
simultaneous contact and proximity of the pointing body to the area of the second portion of the OSK, and
simultaneous contact and proximity of the pointing body to the plurality of areas of the second portion of the OSK.

13. The method of claim 11, further comprising:
monitoring the operational state of the OSK; and
in response to detecting a change in the operational state:
- switching the input mode of the first portion of the OSK from the second mode of operation to the first mode of operation, and
- switching the third mode of the second portion of the OSK to the input mode of operation.

14. A program product comprising a non-transitory computer-readable storage medium that stores code executable by a processor, the executable code comprising code to perform:
- determining a particular operational state of an on screen keyboard (OSK) based on a user providing a user input at a second portion of the OSK;
- in response to determining the particular operational state:
  - switching an input mode of operation for a portion of the OSK from a first mode of operation to a second mode of operation, and
  - switching the second portion of the OSK from the input mode of operation to a third mode of operation including:
    - a non-functional portion, and
    - operations for determining a different mode of operation for the second portion of the OSK; and
- in response to the user continuously providing the user input at the second portion of the OSK:
  - operating the first portion of the OSK in the second mode of operation, and
  - operating the second portion of the OSK in the third mode of operation.

15. The program product of claim 14, wherein:
the code that detects the particular operational state further comprises code to perform detecting a non-key operational state for the OSK; and
the non-key operation state comprises one of:
- one of contact and proximity of a pointing body to an area of the second portion of the OSK,
- one of contact and proximity of the pointing body to a plurality of areas of the second portion of the OSK,
- simultaneous contact and proximity of the pointing body to the area of the second portion of the OSK, and
- simultaneous contact and proximity of the pointing body to the plurality of areas of the second portion of the OSK.

16. The program product of claim 14, wherein the executable code further comprises code to perform:
monitoring the operational state of the OSK; and
in response to detecting a change in the operational state:
- switching the input mode of the first portion of the OSK from the second mode of operation to the first mode of operation, and
- switching the third mode of the second portion of the OSK to the input mode of operation.

17. The apparatus of claim 1, wherein the code is further executable by the processor to switch the second portion of the software keyboard from the first mode of operation to the third mode in response to detecting the particular operational state.

18. The apparatus of claim 17, wherein:
the first mode of operation comprises a character input mode; and
the second mode of operation comprises a directional input mode.

19. The method of claim 11, further comprising:
switching the second portion of the OSK from the first mode of operation to the third mode in response to detecting the particular operational state,
wherein:
the first mode of operation comprises a character input mode, and
the second mode of operation comprises a directional input mode.

20. The program product of claim 14, wherein:
the executable code further comprises code to perform switching the second portion of the OSK from the first mode of operation to the third mode in response to detecting the particular operational state;
the first mode of operation comprises a character input mode; and
the second mode of operation comprises a directional input mode.

* * * * *